United States Patent
Won et al.

(10) Patent No.: US 7,277,275 B2
(45) Date of Patent: Oct. 2, 2007

(54) PORTABLE COMPUTER HAVING ADJUSTABLE DISPLAY

(75) Inventors: Bum-young Won, Suwon (KR); Young-shin Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/819,286

(22) Filed: Apr. 7, 2004

(65) Prior Publication Data
US 2004/0203994 A1 Oct. 14, 2004

(30) Foreign Application Priority Data
Apr. 9, 2003 (KR) .................. 10-2003-0022422
Dec. 2, 2003 (KR) .................. 10-2003-0086942

(51) Int. Cl.
G06F 1/16 (2006.01)
H05K 5/00 (2006.01)

(52) U.S. Cl. .................. 361/681; 361/679; 361/683; 248/918; 248/919; 248/920; 248/921; 248/922

(58) Field of Classification Search ............. 361/681, 361/679, 683; 248/917–923
See application file for complete search history.

(56) References Cited

U.S. PATENT DOCUMENTS

| | | | |
|---|---|---|---|
| 4,238,792 A | 12/1980 | Cohen et al. | 345/173 |
| 4,517,660 A | 5/1985 | Fushimoto et al. | 361/681 |
| 4,718,740 A | 1/1988 | Cox | 312/223.2 |
| 4,742,478 A | 5/1988 | Nigro, Jr. et al. | 361/680 |
| 4,785,564 A | 11/1988 | Gurtler | 40/448 |
| 4,830,328 A | 5/1989 | Takach, Jr. et al. | 361/685 |
| 4,839,837 A | 6/1989 | Chang | 361/680 |
| 4,851,812 A | 7/1989 | Holmberg | 340/407.2 |

(Continued)

FOREIGN PATENT DOCUMENTS

EP 0149762 7/1985

(Continued)

OTHER PUBLICATIONS

"statics." Grolier Multimedia Enclyclopedia. 2006. Grolier Online. Mar. 7, 2006 <http://gme.grolier.com/cgi-bin/article?ssetid=02758 20-0>.☐☐.*

(Continued)

Primary Examiner—Jayprakash Gandhi
Assistant Examiner—Zachary M Pape
(74) Attorney, Agent, or Firm—Staas & Halsey LLP

(57) ABSTRACT

A portable computer having a display connected to a main body, the display rotating to be adjusted to a closed position and to a tablet operation position. Arm links between the main body and the display connect the display with the main body. Display hinges are between the display and a first end of each of the arm links and by which the display rotates about the arm links centering on a first rotation axis. Main body hinges are between the main body and a second end each of the arm links and by which the arm links rotates about the main body centering on a second rotation axis parallel with and spaced from the first rotation axis. A connecting link connected to each of the main body hinges to rotate about the main body centering on the second rotation axis together with the arm links.

31 Claims, 14 Drawing Sheets

U.S. PATENT DOCUMENTS

| | | | | |
|---|---|---|---|---|
| 4,864,523 | A | 9/1989 | Sasaki | 361/680 |
| 4,949,079 | A | 8/1990 | Loebner | 345/180 |
| 4,978,949 | A | 12/1990 | Heron et al. | 345/180 |
| 5,200,913 | A | 4/1993 | Hawkins et al. | 361/681 |
| 5,255,214 | A * | 10/1993 | Ma | 361/680 |
| 5,333,116 | A | 7/1994 | Hawkins et al. | 361/681 |
| 5,548,478 | A * | 8/1996 | Kumar et al. | 361/681 |
| 5,644,469 | A * | 7/1997 | Shioya et al. | 361/681 |
| 5,751,544 | A * | 5/1998 | Song | 361/681 |
| D416,003 | S | 11/1999 | Schiefer et al. | D14/106 |
| 6,005,767 | A | 12/1999 | Ku et al. | 361/681 |
| 6,219,681 | B1 | 4/2001 | Hawkins et al. | 708/100 |
| 6,262,885 | B1 * | 7/2001 | Emma et al. | 361/683 |
| 6,266,236 | B1 * | 7/2001 | Ku et al. | 361/681 |
| 6,366,935 | B2 | 4/2002 | Hawkins et al. | 708/100 |
| 6,694,569 | B2 * | 2/2004 | Chien et al. | 16/367 |
| 6,700,773 | B1 * | 3/2004 | Adriaansen et al. | 361/680 |
| 6,704,194 | B2 * | 3/2004 | Koo | 361/683 |
| 6,707,665 | B2 * | 3/2004 | Hsu et al. | 361/681 |
| 6,972,947 | B2 * | 12/2005 | Duncan | 361/683 |
| 6,980,243 | B2 * | 12/2005 | Miyawaki et al. | 348/302 |
| 7,203,058 | B2 * | 4/2007 | Hong | 361/681 |
| 2005/0078444 | A1 * | 4/2005 | Hong | 361/683 |
| 2005/0083644 | A1 * | 4/2005 | Song | 361/683 |
| 2005/0128695 | A1 * | 6/2005 | Han | 361/683 |
| 2006/0077622 | A1 * | 4/2006 | Keely et al. | 361/681 |
| 2006/0256512 | A1 * | 11/2006 | Esther Kang | 361/681 |

FOREIGN PATENT DOCUMENTS

| | | | |
|---|---|---|---|
| JP | 1-116826 | | 8/1969 |
| JP | 62-57821 | | 4/1987 |
| JP | 63-128409 | | 6/1988 |
| JP | 1-131913 | | 5/1989 |
| JP | 07-049725 | * | 2/1995 |
| JP | 63-39731 | | 3/1998 |

OTHER PUBLICATIONS

Travelmate 100 Series Notebook Computer User Manual; *Acer Incorporated*; Copyright 2001; 83 pages.

CLIO C-1050 Series User Manual; *Vadem*; 1999.

* cited by examiner

PORTABLE COMPUTER HAVING ADJUSTABLE DISPLAY

CROSS-REFERENCE TO RELATED APPLICATIONS

This application claims the benefit of Korean Patent Application No. 2003-22422, filed Apr. 9, 2003 in the Korean Intellectual Property Office, and Korean Patent Application No 2003-86942, filed Dec. 2, 2003 in the Korean Intellectual Property Office, the disclosures of which are incorporated herein by reference.

BACKGROUND OF THE INVENTION

1. Field of the Invention

The present invention relates to a portable computer, and more particularly, to a portable computer on which it is convenient for a user to perform tablet operations.

2. Description of the Related Art

Generally, a laptop computer, a notebook computer, a palmtop computer, and other similar devices are collectively referred to as portable computers. A conventional portable computer, such as that disclosed in U.S. Pat. No. 6,005,767, includes a main body provided with a plurality of components, and a display to display a picture thereon by receiving a video signal from the main body. The display is foldably connected to the main body with a first hinge part and a second hinge part. Thus, the display can be laid and stood on the main body.

The main body is internally provided with a main board including a central processing unit (CPU), a graphic chip, etc. The main body is externally provided with an input unit such as a keyboard, a mouse, etc. Therefore, a user inputs data through the input unit, and the data is displayed as a picture on an LCD (liquid crystal display) panel of the display.

In the conventional portable computer, the display can be tilted from an angle of 0° to an angle of 180°. The angle of 0° defines a state in which the display is completely laid on the main body. An angle of 90° defines a state in which the display is vertically stood on the main body. The angle of 180° defines a state in which the display is completely opened and is parallel with the main body.

When the display is tilted within the angle of 0° to 180°, the display rotates about the first and second hinge parts. The first hinge part includes a sleeve having a pair of grooves, and a cylinder having a recess. The second hinge part is similar to the first hinge part and has a sleeve.

In conventional portable computers, it is preferable that the display has a touch-screen function allowing a user to do tablet operations, and the first and second hinge parts have a structure convenient for a user to smoothly and finely tilt the display at various tilting angles.

SUMMARY OF THE INVENTION

Accordingly, it is an aspect of the present invention to provide a portable computer on which it is convenient for a user to do tablet operations.

Additional aspects and/or advantages of the invention will be set forth in part in the description which follows and, in part, will be obvious from the description, or may be learned by practice of the invention.

The foregoing and/or other aspects of the present invention are also achieved by providing a portable computer comprising a main body, a display connected to the main body, the display being rotated to be adjusted to a closed position in which a front surface of the display is parallel with and in contact with the main body to be folded onto the main body and to a tablet operation position in which a rear surface of the display is parallel with and in contact with the main body to be folded onto the main body, a pair of arm links provided between the main body and the display to connect the display with the main body, display hinges which are provided between the display and a first end of each of the pair of arm links and by which the display rotates about the pair of arm links centering on a first rotation axis; main body hinges which are provided between the main body and a second end each of the pair of arm links and by which the pair of arm links rotates about the main body centering on a second rotation axis parallel with and spaced from the first rotation axis, and a connecting link connected to each of the main body hinges to rotate about the main body centering on the second rotation axis together with the arm links.

According to an aspect of the invention, the pair of arm links is disposed in parallel at opposite sides of the display.

According to an aspect of the invention, each of the arm links comprises an outer cover forming an outer enclosure, and an inner cover combined to the outer cover to form an accommodating space inside each of the arm links, and the inner cover comprises a first end having a first hinge hole, and a second end comprising an extended part having a second hinge hole.

According to an aspect of the invention, the display comprises an LCD panel, a front cover connected to a rear cover to support a front and the rear of a LCD panel, respectively.

According to an aspect of the invention, each of the display hinges comprises: a first shaft member comprising a first hinge shaft to pass through the first hinge hole and to be aligned with the first rotation axis and a first shaft supporter rotatably connected to the first hinge shaft with a predetermined rotation friction; and a first shaft supporting bracket combined to the rear cover to support the first shaft member on the display.

According to an aspect of the invention, one of the first shaft members has a first cable through hole formed along the first rotation axis, and each of the first shaft supporting brackets has a first hinge shaft hole to be aligned with the first cable through hole and which accommodates the first hinge shaft which passes through the first hinge hole of the inner cover.

According to an aspect of the invention, the main body hinge comprises second shaft members, each of the second shaft members being interposed between the extended part of each arm links, each of opposite ends of the connecting link, and the main body.

According to an aspect of the invention, the second shaft member includes a second hinge shaft rotatably inserted in the second hinge hole of the extended part aligned with the second rotation axis, a second shaft supporter having a first end to be rotatably connected to the second hinge shaft with a predetermined rotation friction and a second end to be connected to the main body, and a second shaft member connector extended from the second hinge shaft toward the connecting link to be connected to each of the opposite ends of the connecting link.

According to an aspect of the invention, each of the second hinge shafts comprises a second cable through hole formed along the second rotation axis and in communication with the accommodating space formed between the inner cover and the outer cover of the arm link, and an opening cut out and in communication with the second cable through hole formed between the second shaft member connector and the second hinge shaft.

According to an aspect of the invention, the portable computer further comprises at least one cable having a first end connected to the display and a second end connected to the main body.

According to an aspect of the invention, the cables are provided in a pair, each of the cables has a first end connected to the display and a second end passing through the accommodating space inside of each of the arm links to be connected to the main body.

According to an aspect of the invention, each of the cables has a first end connected to the display and a second end that passes through the first cable through hole of the first shaft member, the accommodating space inside of each of the arm links, the second cable through hole of the second hinge shaft and draws out through the opening to be connected to the main body.

According to an aspect of the invention, each of the opposite ends of the connecting link is connected to the second shaft member connector with a fastener.

According to an aspect of the invention, each of the opposite ends of the connecting link is forcibly fitted to the second shaft member connector According to an aspect of the invention, the front cover is formed with a first latch hole, and the rear cover is formed with a second latch hole, and the portable computer further comprises a latch member provided on the main body so as to be latched to or released from the first latch hole when the LCD panel of the display is in contact with an upper surface of the main body and so as to be latched to or released from the second latch hole when the display is completely folded onto the main body, exposing the LCD panel to an exterior side opposite an interior side facing the main body; and a knob to push the latch member to a releasing position.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE EMBODIMENTS

Figure 1:
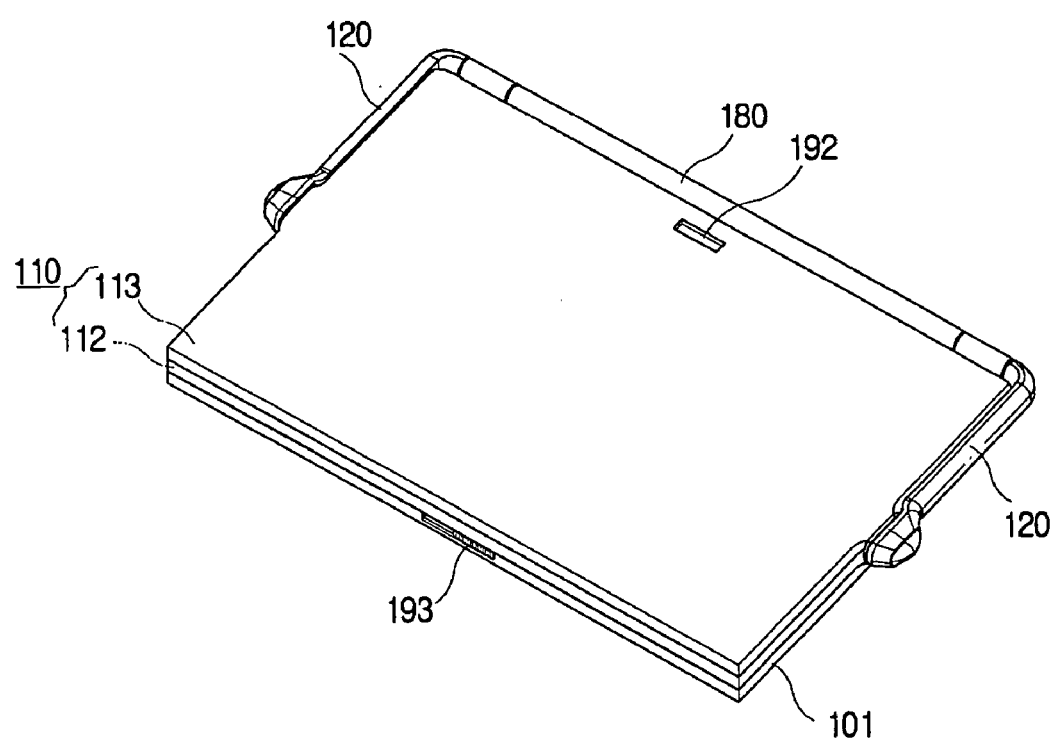
FIG. 1 is a perspective view of a portable computer according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Referring to FIGS. 1 through 7, a portable computer according to an aspect of the present invention comprises a main body 101 provided with a plurality of components. A display 110 displays a picture thereon by receiving a video signal from the main body 101. A pair of arm links 120 have a first end rotatably connected to the main body 101 and a second end rotatably connected to the display 110.

An embodiment of the main body 101 is internally provided with a main board (not shown) including a central processing unit (CPU), a graphic chip (not shown), etc., and is externally provided with an input unit such as an input unit 103 such as a keyboard, a mouse, or other such device. The main body 101 and the display 110 are electrically connected by a first cable 105 and a second cable 107. Further, a predetermined signal is transferred from the main body 101 to the display 110 through the first and second cables 105 and 107. As an aspect of the present invention, digital and power signals are transferred through the first cable 105, and antenna and switch signals are transferred through the second cable 107. However, the digital and power signals may be transferred through the second cable 107 and the antenna and switch signals may be transferred through the first cable 105, according to another aspect of the invention.

A latch member 190 is provided on the front of the main body 101 to be latched to a first latch hole 191 or a second latch hole 192 of the display 110 (to be described later). A knob 193 is on the main body 101 so as to push the latch member 190 to a releasing position. However, it is understood that the latch member 190, the holes 191, 192, and/or the knob 193 need not be used in all aspects of the invention.

A connecting link 180 is provided on the rear of the main body 101 to connect a pair of arm links 120 with each other. A battery assembly 194 is detachably provided under the connecting link 180 to supply electric power to the main body 101. The connecting link 180 comprises a pair of covers 181 to cover an upper part of the connecting link 180 and a lower part of the connecting link 180, respectively. The connecting link 180 is aligned with a second rotation axis (to be described later), and connects the pair of arm links 120 with each other. Using the connecting link 180, each of the pair of arm links 120 can be simultaneously rotated with respect to the main body 101, when the display 110 is rotated with respect to the main body 101 (refer to FIGS. 3 and 4). Further, as the connecting link 180 is provided on the rear side of the main body 101, the portable computer has a slim shape (refer to FIGS. 8 through 10). However, it is understood that other mechanisms can be used for a detachable type battery, and that the battery assembly 194 used not be detachable in all aspects of the invention.

Figure 2:
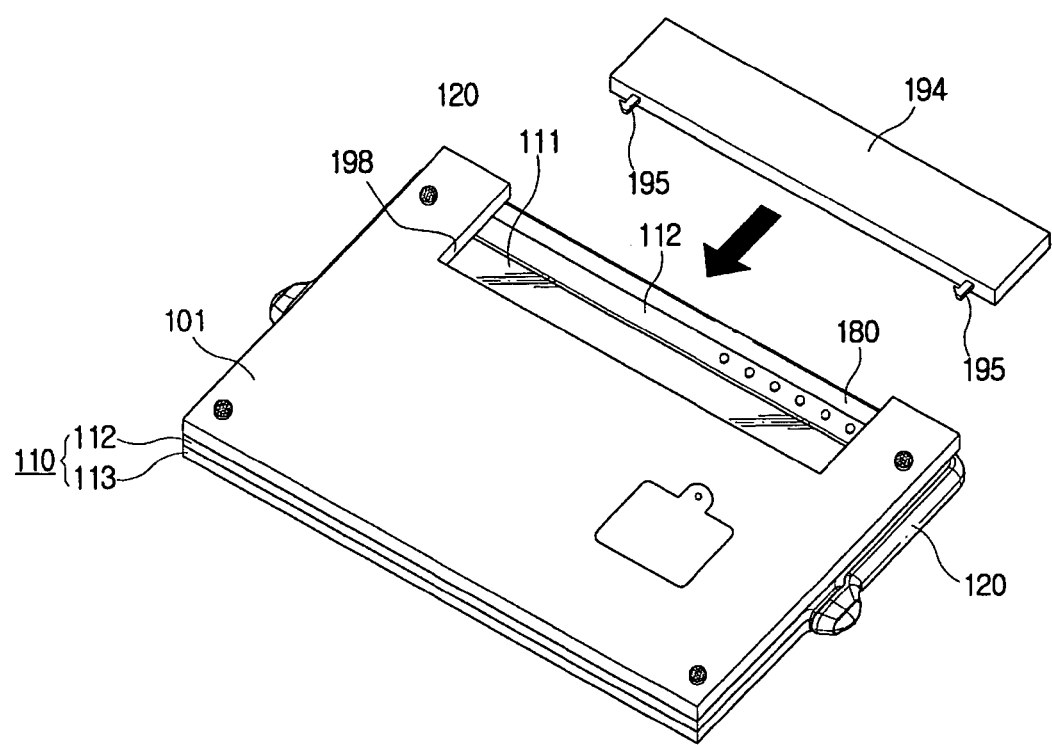
FIG. 2 is a perspective view showing the rear of the portable computer in FIG. 1.

As shown in FIG. 2, the battery assembly 194 is detachably accommodated in a battery accommodating part 198 placed under the connecting link 180. A side of the battery assembly 194 is formed with hooks 195 that are hooked with and released from hook holes (not shown) formed in the battery accommodating part 198.

While not required in all aspects of the invention, where input to the portable computer is to be partially accomplished using the display 110, the display 110 has a touch-screen function. The touch screen function allows a user to do tablet operations with an input device such as a stylus pen (not shown). The display 110 includes the LCD panel 111 to display a picture thereon by receiving the video signal from the main body 101, and front and rear covers 112 and 113 that are combined to each other to cover outer portions of the LCD panel 111. While described in terms of the LCD, it is understood that other types of displays could be used, including but not limited to, plasma display panels (PDPs), organic light-emitting diodes (OLEDs), cathode ray tubes (CRTs), flat panel displays, and other such devices.

Figure 10:
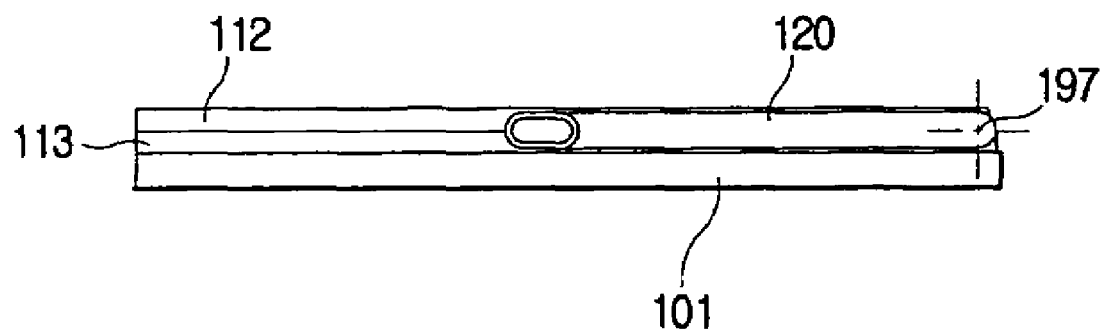
FIG. 10 is a lateral view illustrating the portable computer in a tablet operation position.
Figure 11:
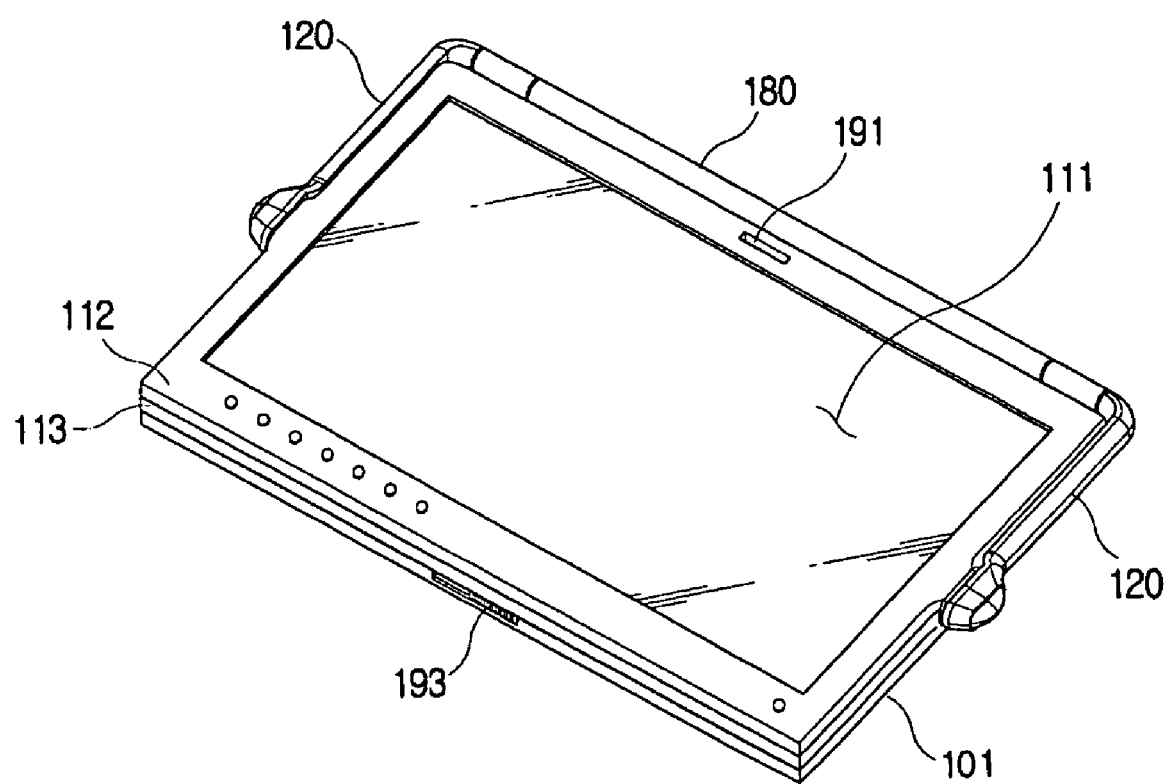
FIG. 11 is a perspective view illustrating the portable computer in a tablet operation position.

The front cover 112 is formed with the first latch hole 191 to which the latch member 190 of the main body 101 is latched at a closed position as shown in FIG. 1 (to be described later). The rear cover 113 is formed with the second latch hole 192 to which the latch member 190 of the main body 101 is latched at a tablet operation position as shown in FIGS. 10 and 11. However, it is understood that the latch holes 191, 192, and/or the latch member 190 need not be used in all aspects of the invention.

The pair of arm links 120 is disposed in parallel at opposite sides of the display 110 according to an aspect of the invention. The arm links 120 connect the display 110 with the main body 101. A display hinge is disposed between a first end of each arm link 120 and the display 110. A main body hinge is disposed between the second end of each arm link 120 and the connecting link 180.

The arm link 120 allows the display 110 to be adjusted to the closed position as shown in FIG. 1. In the closed position, the LCD panel 111 of the display 110 is in contact with the keyboard 103 of the main body 101. The arm link 120 further allows an unfolded position as shown in FIGS. 3, 4, 8 and 9 in which the LCD panel 111 of the display 110 is tilted relative to the main body 101. The arm link 120 also allows a tablet operation position as shown in FIGS. 10 and 11 in which the rear cover 113 of the display 110 is approximately parallel with and in contact with the upper surface of the main body 101 including the keyboard 103.

The shown arm link 120 comprises an outer cover 130 forming an outer enclosure. An inner cover 140 is combined to the outer cover 130 to form a cable passage through the arm link 120 for the cables 105 and 107. The outer cover 130 has a first end 131 protruding outwardly, and a second end 132 being curved inwardly. Inside the outer cover 130 is formed a plurality of boss parts 133 at intervals along a lengthwise direction of the outer cover 130. Each boss part 133 is threaded and combined with a corresponding first screw 134 which passes through a corresponding through hole 146 of the inner cover 140.

The inner cover 140 has a first end 141 and a second end 142. The first end 141 is bent outwardly to correspond with the first end 131 of the outer cover 130. The second end 142 is curved inwardly to correspond with the second end 132 of the outer cover 130. The first end 141 of the inner cover 140 is formed with a first hinge hole 144 into which a first hinge shaft 151 of a first shaft member 150 (to be described below) is rotatably inserted. The second end 142 of the inner cover 140 is formed with an extended part 143 having a second hinge hole 145 into which a second hinge shaft 171 of a second shaft member 170 (to be described later) is rotatably inserted. The inner cover 140 is formed with the plurality of through holes 146 at positions corresponding to the boss parts 133 of the outer cover 130 so as to pass a threaded part of the first screw 134 there through.

The display hinge is provided between the display 110 and each of the arm links 120. The display hinge allows the display 110 to rotate relative to the pair of arm links 120. The display hinge includes the first hinge hole 144 of the inner cover 140, the first shaft member 150, and a first shaft supporting bracket 160. The first shaft member 150 has the first hinge shaft 151 that is rotatably inserted in the first shaft hole 144. The first shaft supporting bracket 160 is combined with the rear cover 113 and supports the first shaft member 150 when the first hinge shaft 151 passes through the first hinge hole 144.

The first shaft member 150 comprises a first shaft supporter 155 accommodated in a space formed between the first end 141 of the inner cover 140 and the first end 131 of the outer cover 130. The first hinge shaft 151 protrudes toward the rear cover 113 and is rotatably connected to the first shaft supporter 155. A first cable through hole 152 is formed along a protruding direction of the first hinge shaft 151 to pass the cables 105 and 107 through the first shaft member 150 along a direction of a first rotation axis 196 (shown in FIG. 3). The first shaft member 150 further includes a pair of flanges 153 extending in opposite directions of the first hinge shaft 151 and fastened between the first end 141 of the inner cover 140 and the first end 131 of the outer cover 130.

A first side of the first hinge shaft 151 is inserted in the first hinge shaft hole 161 of the first shaft supporting bracket 160 mounted on the display 110 so as to be stationary, which prevents the first hinge shaft 151 from rotating with respect to the first shaft supporting bracket 160. A second end of the first hinge shaft 151 is rotatably connected to the first shaft supporter 155 with a predetermined rotation friction. Thus, a user needs to apply at least a predetermined force on the display 110 to rotate the display 110 with respect to the arm links 120. The predetermined rotation friction prevents the display 110 from unnecessarily rotating with respect to the arm links 120 due to the weight of the display 110. While not required, the rotation friction is preferably of a magnitude against which the user can rotate the display 110 with respect to the arm links 120 with ease. The display 110 is rotated with respect to the first hinge shaft 151 in a direction A or B shown in FIG. 3. That is, the display 110 is rotated with respect to the first rotation axis 196 in a direction A or B, as the first rotation axis 196 is the same rotation axis of the first hinge shaft 151 provided in opposite sides of the display 110. As shown, the display 110 is preferably rotated within a rotation angle of 360°. However, it is understood that the display 110 can be rotated within other rotation angles, and that other torsion-inducing devices, such as springs or hydraulic mechanisms, can be used instead of or in addition to the frictional force in order to maintain a predetermined angle between the display 110 and the arm links 120.

Each flange 153 is formed with a through hole 154 to be aligned with the through hole 146 formed on the first end 141 of the inner cover 140. Thus, the threaded part of the pair of first screws 134 (not shown), which are used to combine the inner cover 140 with the outer cover 130, are sequentially inserted in the through hole 146 formed on the first end 141 of the inner cover 140, the through hole 154 formed on the flange 153 of the first shaft member 150. The boss members 133 formed on the first end 131 of the outer cover 130. Thus, the first end 141 of the inner cover 140, the first shaft member 150 and the first end 131 of the outer cover 130 are combined with one another.

The first shaft supporting bracket 160 comprises a first hinge shaft hole 161 in which the first end of the first hinge shaft 151 is inserted so as to be stationary. A pair of wings 162 extend in opposite directions of the first shaft supporting bracket 160. On each wing 162 are formed a projection groove 163 in which a projection 114 of the rear cover 113 is inserted. Each wing 162 includes a through hole 164 through which a second screw 165 passes and combines with a screw hole 115 formed on the rear cover 113.

The main body hinge is provided between the pair of arm links 120 and the main body 101. The main body hinge allows the arm links 120 to rotate with respect to the main body 101. The main body hinge includes the second hinge hole 145 formed on the extended part 143 of the second end 142 of the inner cover 140, and the second shaft member 170 provided between the extended part 143 of the inner cover 140 and an end of the connecting link 180.

Figure 3:
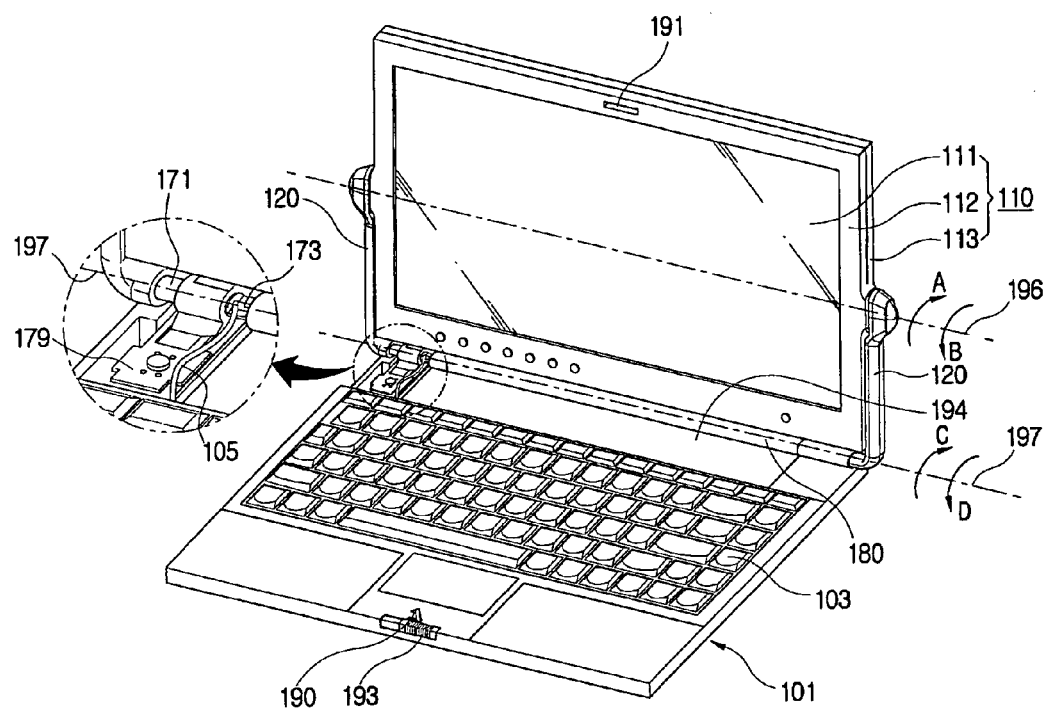
FIGS. 3 and 4 are perspective views illustrating an unfolded state of the portable computer in FIG. 1.
Figure 4:
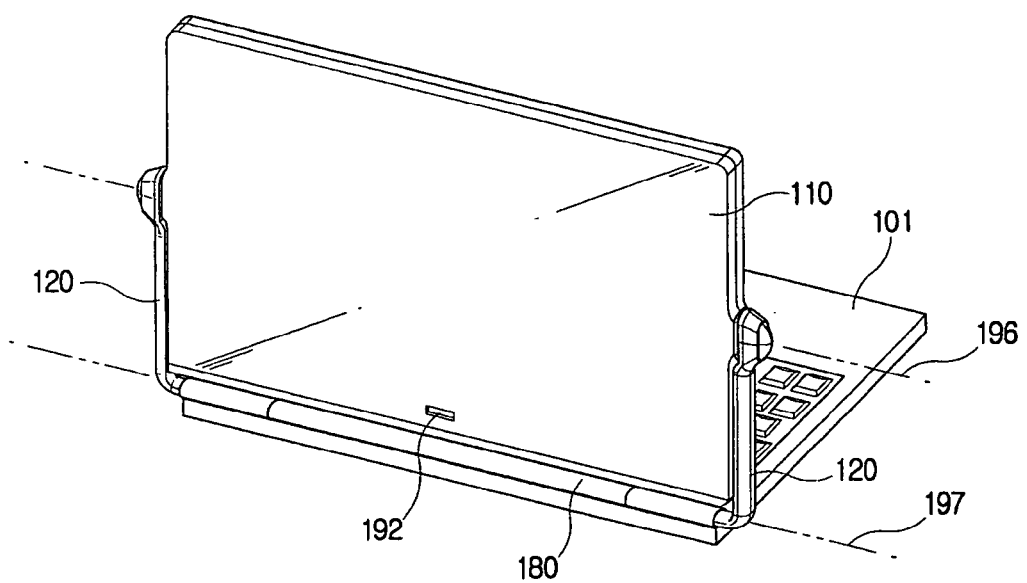

The second shaft member 170 comprises the second hinge shaft 171 to be rotatably inserted in the second hinge hole 145 formed on the extended part 143 of the inner cover 140 and to be rotated with respect to a second rotation axis 197 (shown in FIG. 3). A second shaft supporter 179 rotatably supports the second hinge shaft 171 with a predetermined rotation friction. An insertion part 174 extends in an opposite direction of the second hinge shaft 171 and is fitted into a groove of the connecting link 180 with third screws 176.

The second shaft supporter 179 has a first end rotatably connected to the second hinge shaft 171 and a second end connected to the main body 101 with a fastener including a screw. A first end of the second hinge shaft 171 is inserted in the second hinge hole 145 formed on the extended part 143 of the inner cover 140 so as to be stationary, which prevents the second hinge shaft 171 from rotating in the second hinge hole 145. A second end of the second hinge shaft 171 is rotatably connected to the second supporter 179 with a predetermined rotation friction, so that a user needs to apply a force on the display 110 to rotate the display 110 with respect to the main body 101. The rotation friction here is similar to that the rotation friction between the first hinge shaft 151 and the first shaft supporter 115, so that a detailed description is not again provided. It is understood that other connection mechanisms can be used to connect the second shaft supporter 179 to the main body 101, and that other torsion-inducing devices, such as springs or hydraulic mechanisms, can be used instead of or in addition to the frictional force in order to maintain a predetermined angle between the main body 101 and the arm links 120.

The second hinge shaft 171 comprises a second cable through hole 172 formed along a direction of the second rotation axis 197 (shown in FIG. 3). The hole 172 is in communication with the cable passage formed between the inner cover 140 and the outer cover 130 of the arm link 120. Thus, each of the cables 105 and 107 sequentially passes through the first cable through hole 152 of the first hinge shaft 151, the cable passage in the arm link 120, and the second cable through hole 172 of the second hinge shaft 171. Therefore, the second hinge shaft 171 is inserted in the second hinge hole 145 so as to be stationary relative to the second hinge hole 145 and is rotatably inserted in the second shaft supporter 179 with a predetermined rotation friction. Thus, the display 110 is rotated with respect to the second hinge shaft 171 in a direction C or D shown in FIG. 3. That is, the display 110 is rotated with respect to the second rotation axis 197 that is formed when the display 110 is rotated with respect to the second hinge shaft 171 in direction C or D. Here, the display 110 is rotated with respect to the second hinge shaft 171 within a rotation angle of 360°. However it is understood that other rotation angles are possible.

Here, the second rotation axis 197 is the same as the rotation axis of pair of the second hinge shafts 171 provided in opposite sides of the main body 101. As shown in FIG. 3, the second rotation axis 197 is formed parallel with and spaced from the first rotation axis 196 and aligned with the connecting link 180. That is, the connecting link 180 is aligned with the second rotation axis 197 (i.e., the rotation axis of the second hinge shaft 171) when the display 110 is rotated with respect to the second hinge shaft 171. The connecting link 180 is inserted in the insertion part 174 and rotated as a single body with the second hinge shaft 171.

The insertion part 174 protrudes from the second hinge 171 toward the connecting link 180. The insertion part 174 has screw holes 175 corresponding to through holes 185 of the connecting link 180. The respective insertion parts 174 are combined to opposite ends of the connecting link 180 having the groove. That is, the insertion part 174 of the second shaft member 170 is inserted in the groove of the connecting link 180 at a corresponding end of the connecting link 180. The screw holes 175 are aligned with the through holes 185 of the connecting link 180. Then, the insertion parts 174 are fastened to the connecting link 180 by third screws 176.

An opening 173 is formed between the insertion part 174 and the second hinge shaft 171 at an upper side thereof. The opening 173 is in communication with the second cable through hole 172. Therefore, each of the cables 105 and 107 sequentially passes through the corresponding first cable through hole 152 of the first hinge shaft 151, the cable passage inside the arm link 120, and the second cable through hole 172 of the second hinge shaft 171 in sequence. Each of the cables 105, 107 is then drawn out through the opening 173 communicating with the second cable through hole 172, and then connected to the main body 101 so as to allow power and/or signals to pass between components in the main body 101 and the display 110.

Figure 5:
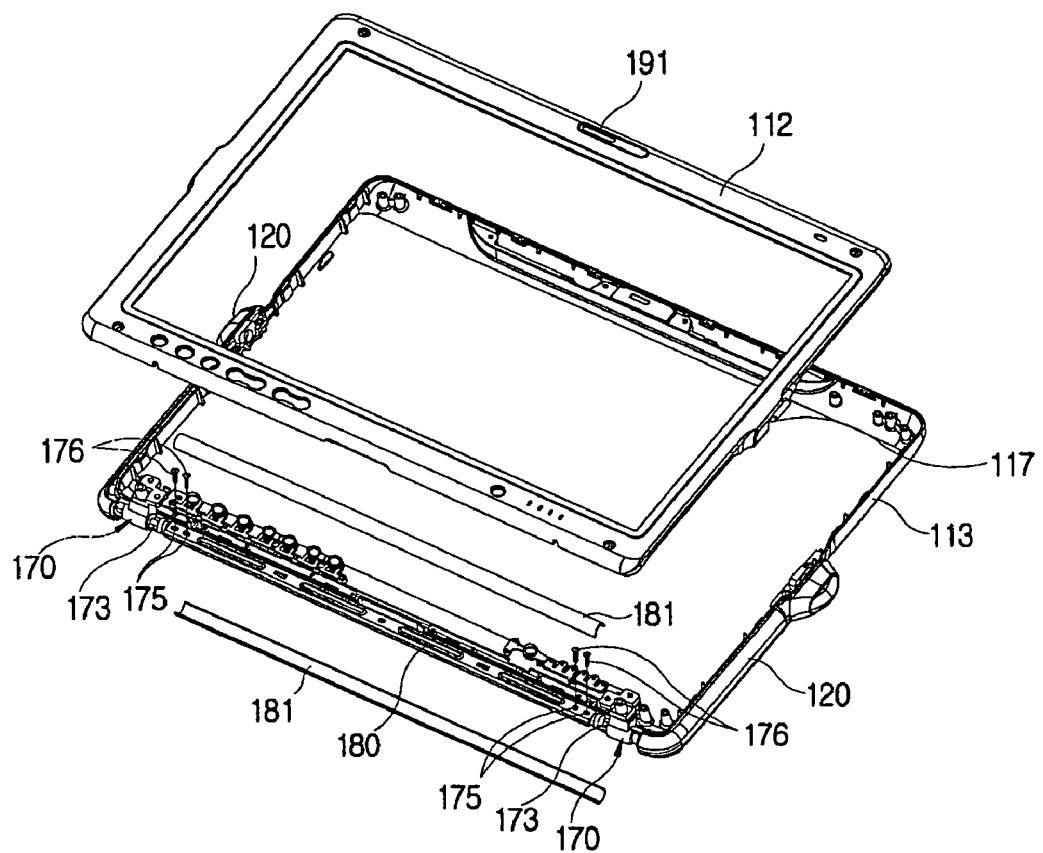
FIGS. 5 and 6 are partial exploded perspective views of the portable computer in FIG. 3.
Figure 6:
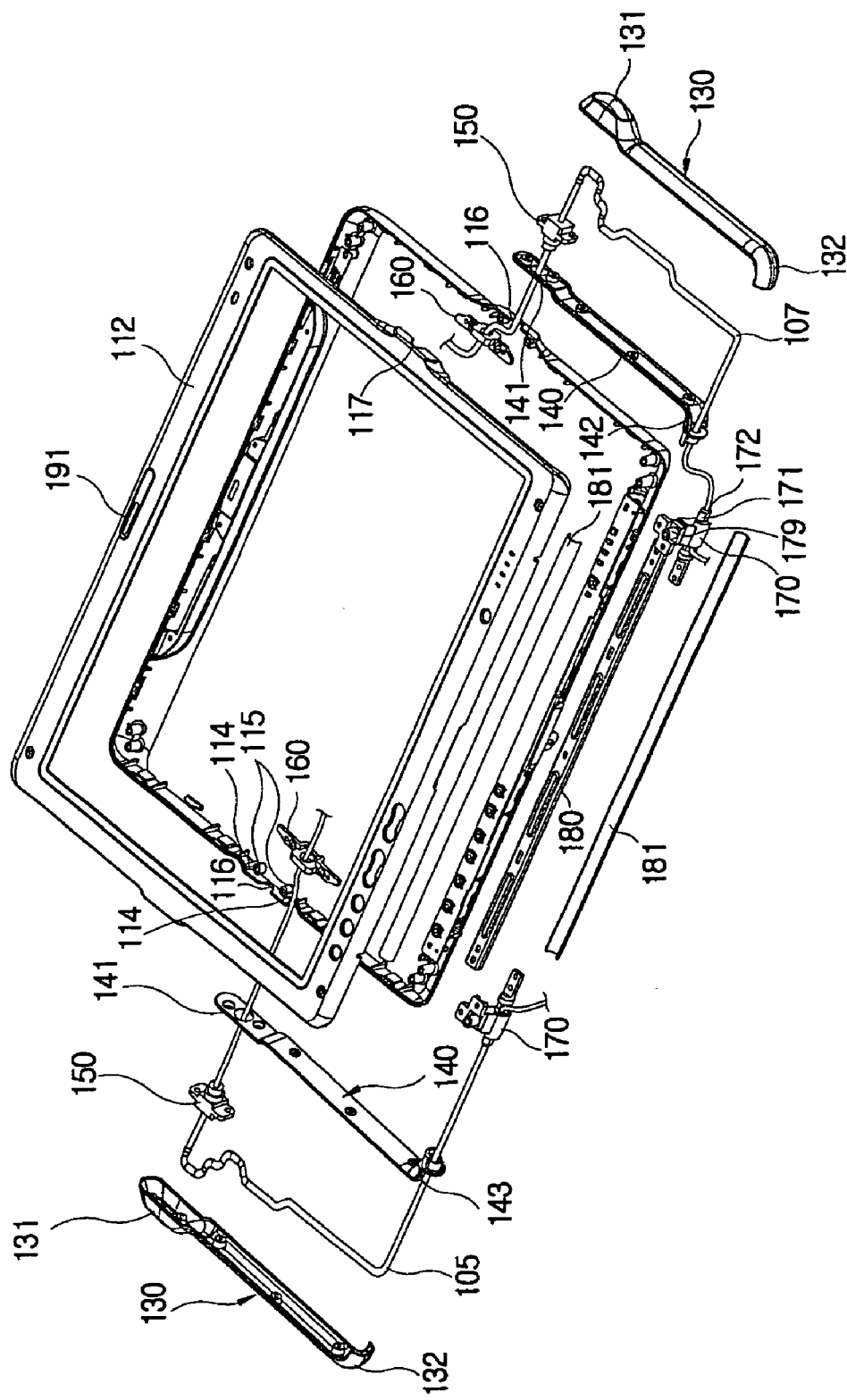
Figure 7:
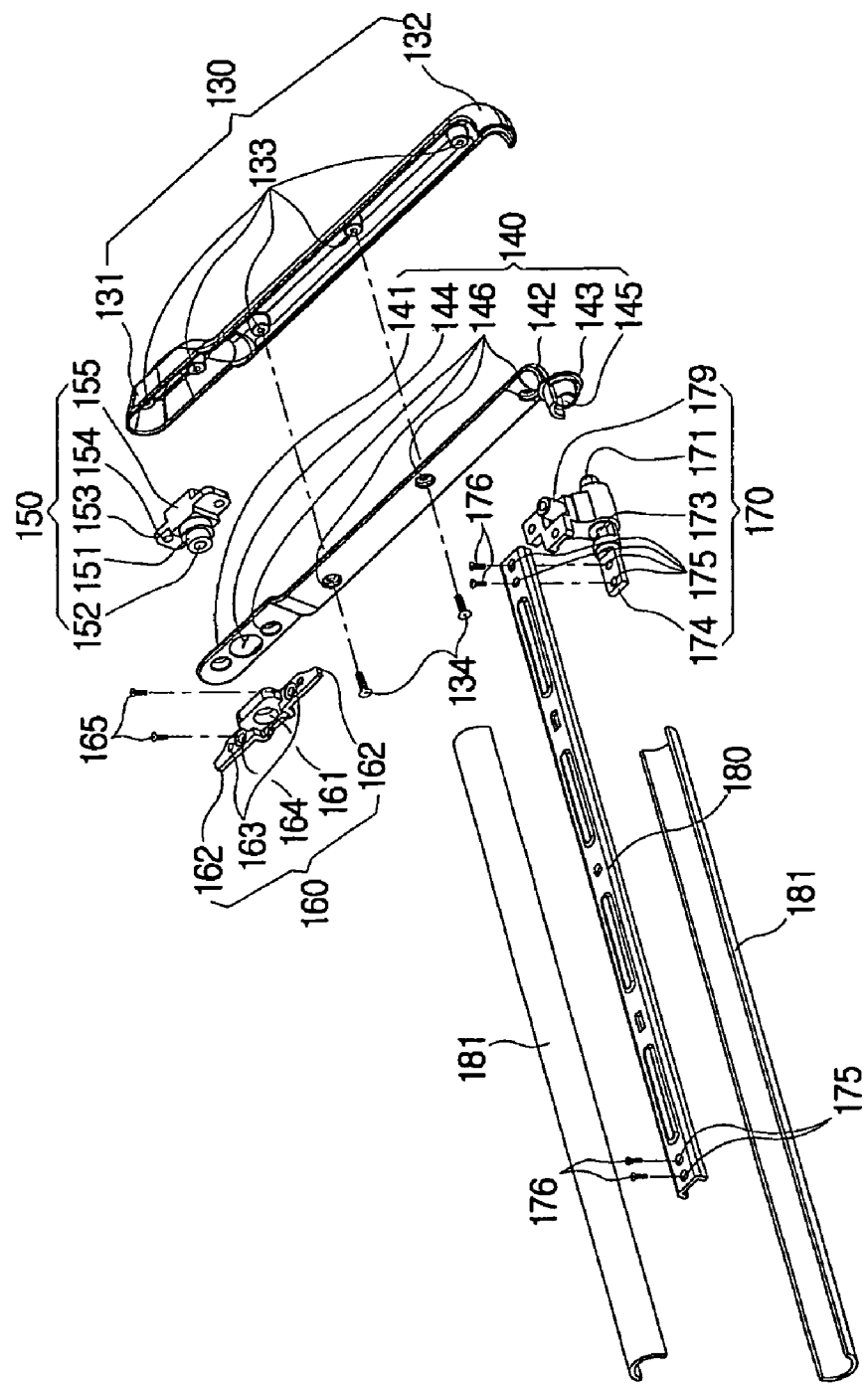
FIG. 7 is a partial enlarged perspective view of the portable computer in FIG. 6.

With the above configuration, with reference to FIGS. 5 through 7, the above-described components are assembled according to an aspect of the invention. The inner cover 140 and the outer cover 130 are combined in the state that the first hinge shaft 151 of the first shaft member 150 is inserted in the first hinge hole 144 formed on the first end 141 of the inner cover 140 of the arm link 120. Thus, the first shaft member 150 is accommodated in the space formed between the first end 141 of the inner cover 140 and the first end 131 of the outer cover 130 after the respective arm links 120 are assembled. The pair of arm links 120, each having the first hinge shaft 151 exposed to the outside through the first hinge hole 144 of the inner cover 140, are combined to the opposites sides of the rear cover 113, respectively. Here, the first hinge shaft 151 is stationarily inserted in the first hinge shaft hole 161 of the first shaft supporting bracket 160.

The projection 114 of the rear cover 113 is inserted into the projection groove 163 formed on the wing 162 of the first shaft supporting bracket 160. The second screw 165 passes through the through hole 164 of the wing 162 and is inserted in the screw hole 115 of the rear cover 113. Specifically, when the pair of arm links 120 is combined to the opposite sides of the rear cover 113, the first hinge shaft 151 is inserted into the first hinge shaft hole 161 of the first shaft supporting bracket 160 and is hung on a first supporting groove 116 of the rear cover 113. Here, the first supporting groove 116 has a semicircular shape, and contacts a semicircular second supporting groove 117 of the front cover 112, thereby forming a circular hole to rotatably accommodate the first hinge shaft 151 therein together with the first hinge shaft hole 161.

After the arm link 120 and the display hinge are combined, the second hinge shaft 171 of the second shaft member 170 is inserted in the second hinge hole 145 formed on the extended part 143 of the inner cover 140. The insertion part 174 of the second shaft member 170 is fitted into the groove of the connecting link 180 at the end of the connecting link 180. The insertion part 174 of the second shaft member 170 and the end of the connecting link 180 are fastened by inserting the third screws 176 into the screw holes 175 through the through holes being aligned with the screw holes 175. Also the connecting link 180 is rotated with respect to the second rotation axis 197 forms the rotation axis of the pair of second hinge shaft 171. The second end of each of the second shaft supporters 179 is connected to the main body 101 with a fastener including a screw. An assemblage of the above-described components is not limited to the foregoing order.

For the portable computer according to an embodiment of the present invention, operation of the display 110 relative to the main body 101 is as follows. As shown in FIG. 1, initially, the display 110 is in the closed position in which the front cover 112 of the 110 is in contact with and/or substantially parallel with an upper surface of the main body 101 including the keyboard 103. That is, the display 110 is completely folded onto the main body 101 (i.e., is facing the main body), and the latch member 190 is latched to the first latch hole 191. When a user wants to use the portable computer, the user pushes the knob 193 and releases the latch member 190 from the first latch hole 191. Thereafter, the user holds the display 110 and tilts the display 110 upward relative to the main body 101. The display 110 rotates about the main body hinge so as to be in the unfolded position shown in FIGS. 3 and 4. In the unfolded position, a user can input data to the portable computer by using the input device 103, which is shown as a keyboard in FIG. 2. It is understood that, while in the closed position, the display need not contact the main body 101 in all aspects of the invention, and that the input device 103 can be other than through a keyboard.

As shown in FIG. 6, in the portable computer according to the embodiment of the present invention, each of the cables 105 and 107 transfers signals and/or electrically connects the display 110 with the main body 101 as follows. A first end of each of the cables 105 and 107 is connected to the display 110. A second end of each of the cables 105, 107 passes through the first cable through hole 152 of the first hinge shaft 151, a cable passage in the arm link 120 and the second cable through hole 172 of the second hinge shaft 170, and is drawn out through the opening 173 of the second hinge shaft 170 in communication with the second cable through hole 172 to be connected to the main body 101. Specifically, each of the cables 105 and 107 is provided through the passage as shown in FIG. 6.

In the portable computer according to an aspect of the present invention, each of the cables 105 and 107 passes only through the arm link 120 and the opening 173 to be connected to the main body 101, so that an additional configuration is not required to provide the cables 105 and 107. Thus, the configuration for the cables 105 and 107 may be simple and the rear of the main body 101 on which the additional configuration for the cables 105 and 107 is conventionally provided, may be in good shape.

Figure 9:
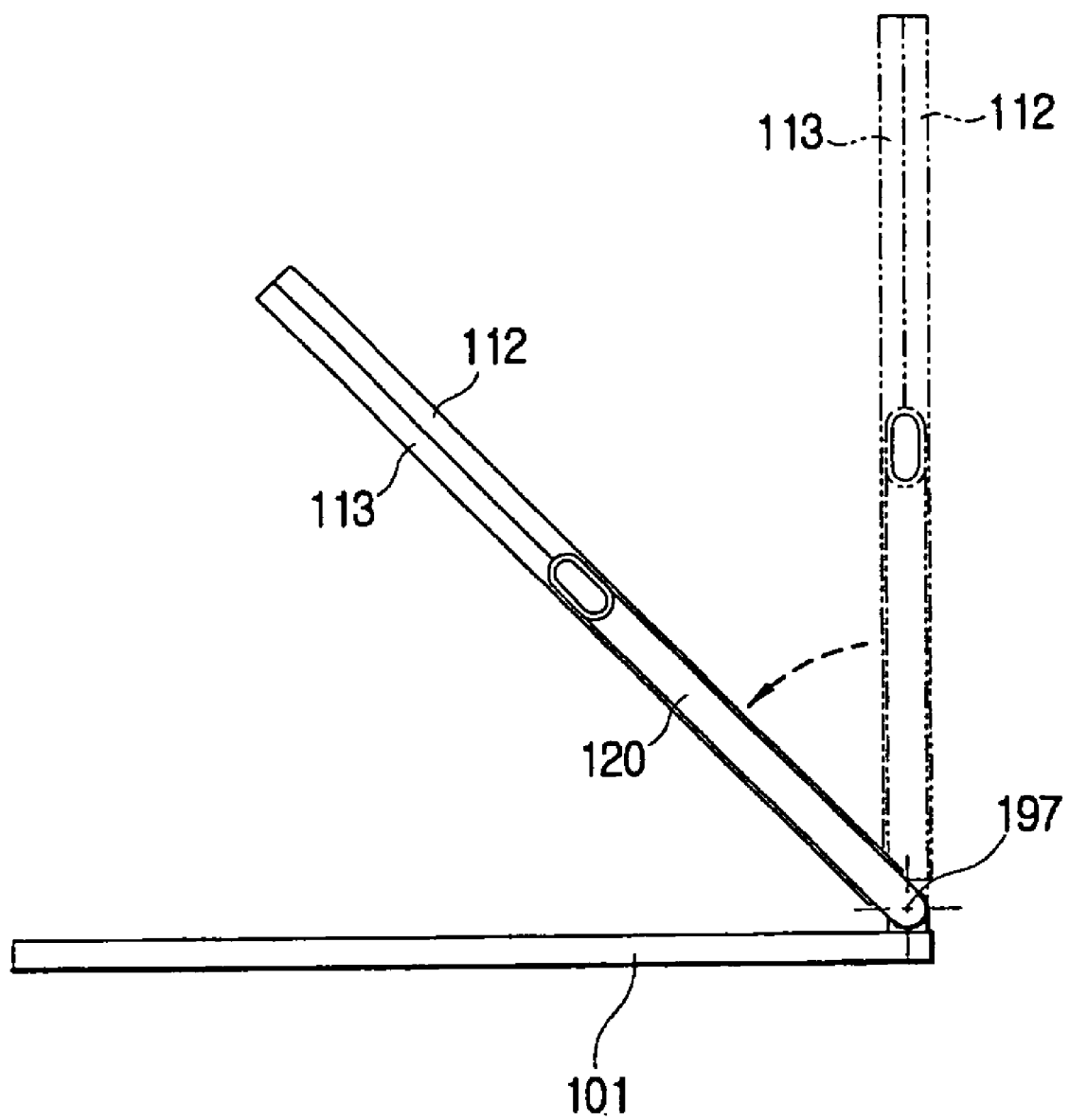

Further, in the portable computer according to an embodiment of the present invention, when a user wants to do the tablet operation while moving, a user can turn the display 110 upside down. When upside down, the LCD panel 111 faces away from the input device 103 of the main body 101 at the tablet operation position as shown in FIG. 10. That is, if a user rotates the display 110 with respect to the first rotation axis 196 in the direction of A in FIG. 3, the display 110 is in the unfolded position (refer to FIG. 3) in which the front cover 112 of the display 110 is directed frontward and the rear cover 113 thereof is directed backward. The display 110 rotates with respect to the first hinge shaft 151 and turns to the position in which the rear cover 113 of the display 110 is directed frontward and the front cover 112 thereof is directed backward as shown in FIG. 9. In the state shown in FIG. 9, if the user holds the display 110 and rotates the display 110 with respect to the second rotation axis 196 in the direction of D shown in FIG. 3, the display 110 is rotated with respect to the second hinge shaft 171 of the main body hinge to be adjusted to the tablet operation position in which the rear cover 113 of the display 110 is substantially parallel with and/or in contact with the upper surface of the main body 101 and the display 110 is folded on the main body 101 as shown in FIGS. 10 and 11. At this time, the latch member 190 is latched in the second latch hole 192 formed on the rear cover 113 of the display 110. While described as being in contact with the main body 101, it is understood that the tablet position need only have the display 110 face away from the main body 101 sufficiently to allow input therethrough. Moreover, it is understood that the latch member 190 need not be used in the tablet position and/or the closed position in all aspects of the invention.

As shown in FIG. 3, the connecting link 180, which connects the pair of the arm links 130 to rotate simultaneously, is aligned with the second rotation axis 197. If the user holds and then rotates the display 110 in the direction of D in FIG. 4 when the display 110 is in the position in which the rear cover 113 is directed frontward and the front cover 112 thereof is directed backward, a torsion between the pair of arm links 120 and the display 110 can be efficiently prevented. The display 110 is smoothly rotated with respect to the second rotation axis 197. Thus, while moving, a user can use the portable computer by gripping the portable computer with one hand and gripping a stylus pen with another hand, and the display 110 is completely folded onto, and the main body 101 to expose the LCD panel 111 to the outside (i.e., be in the tablet position). Additionally, when the display 110 is in the tablet operation position, the portable computer according to an embodiment of the present invention can be used on a table.

Figure 8:
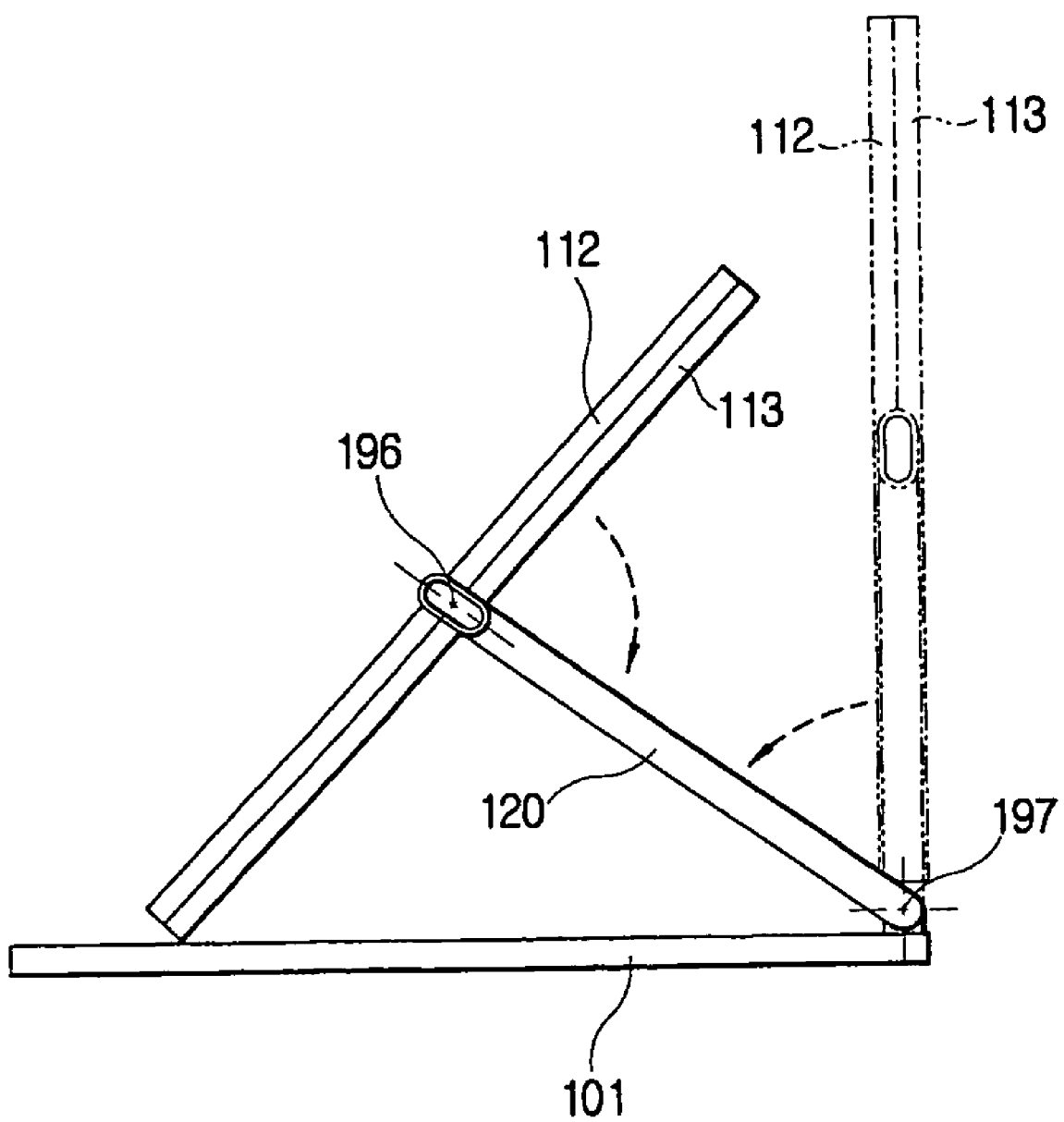
FIGS. 8 and 9 illustrate operations of the portable computer according to an embodiment of the present invention.

Further, the display 110 shown in FIG. 3 can rotate to a position shown in FIG. 8 by using both of the main body hinge and the display hinge. If a user holds the display 110 and then pulls up a lower part of the display 110 toward the user, the display 110 rotates with respect to both of the display hinge and the main body hinge, decreasing an angle between the display 110 and the main body 101 as shown in FIG. 8. Then, the lower part of the display 110 is put on the main body 101.

Because of the rotational friction generated when the first hinge shaft 151 is rotatably inserted in the first shaft supporter 155 and the second hinge shaft 171 is rotatably inserted in the second supporter 179, the display 110 can be kept at a predetermined angle relative to the main body 101 as shown in FIG. 8. In order to move the display 110 from the predetermined angle, the user applies a force greater than the rotational friction to the display 110. Therefore, the user can adjust the display 110 to a variety of angles, as desired.

As shown in embodiment shown in FIG. 5, the insertion part 174 (shown in FIG. 7) of the second shaft member 170 is inserted through an end of the connecting link 180 into the inside of the connecting link 180 having the groove. The insertion part 174 of the second shaft member 170 is connected by inserting the third screws 176 in the screw holes 175 aligned with the connecting link 180.

Figure 12:
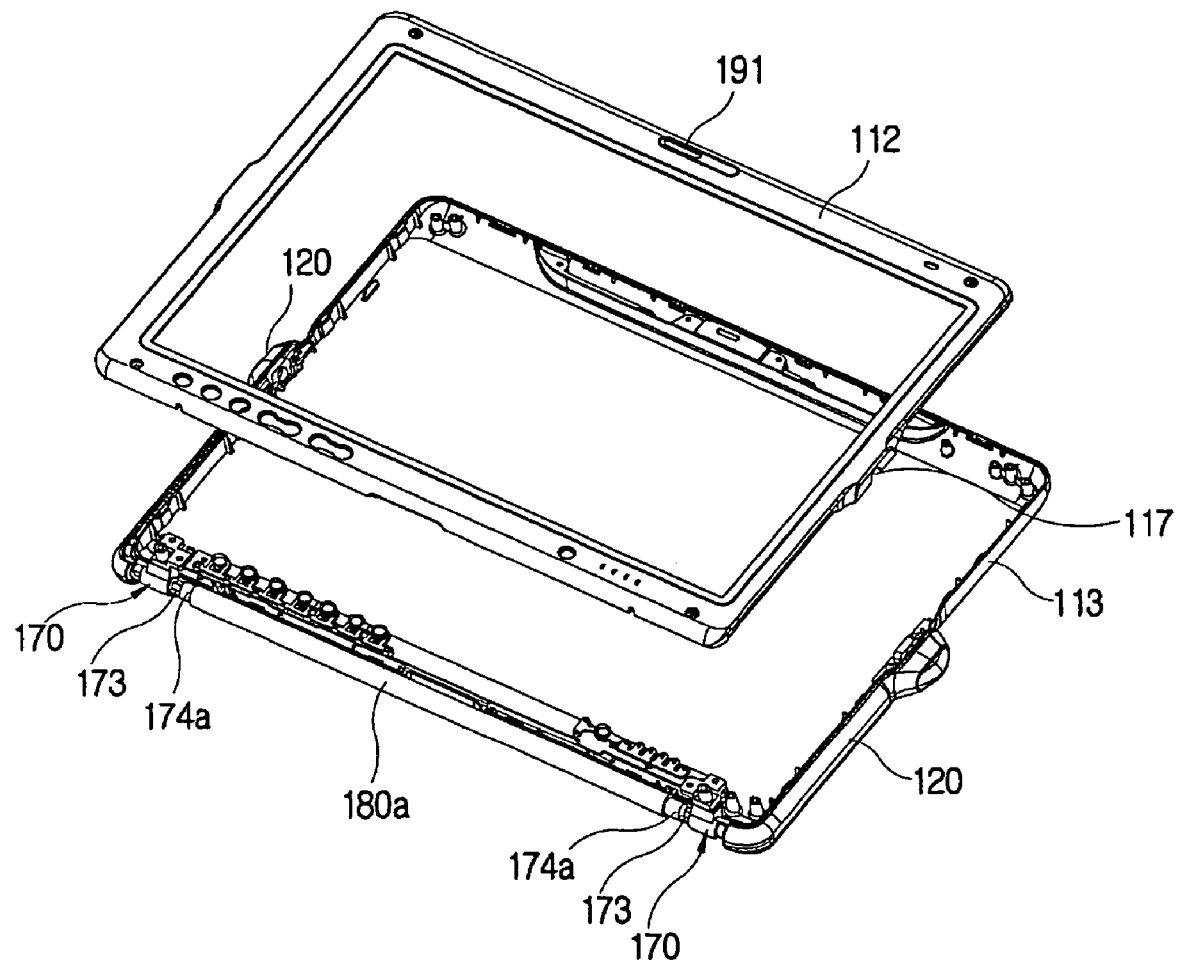
FIGS. 12 and 13 are partial exploded perspective views of a portable computer according to another embodiment of the present invention.
Figure 13:
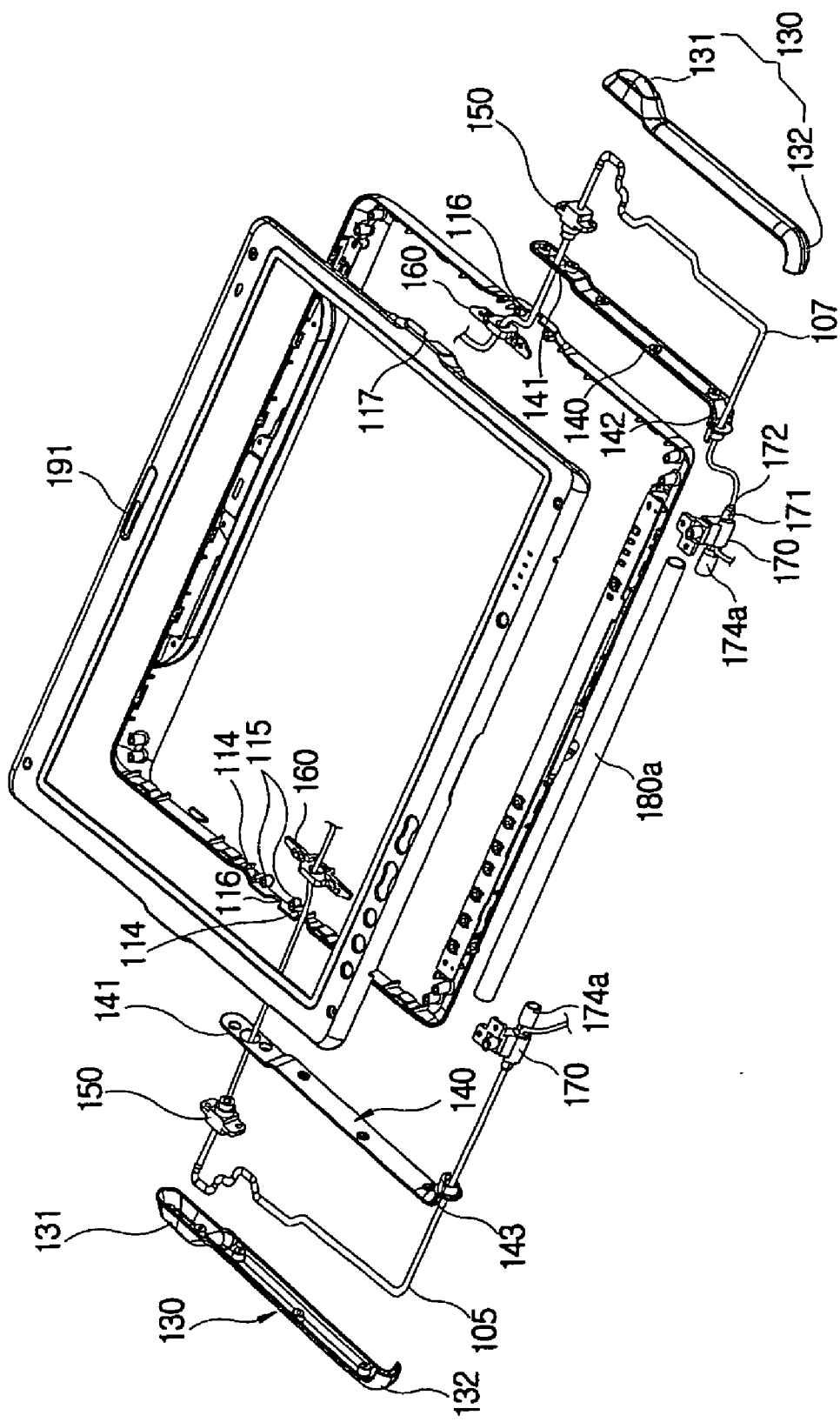
Figure 14:
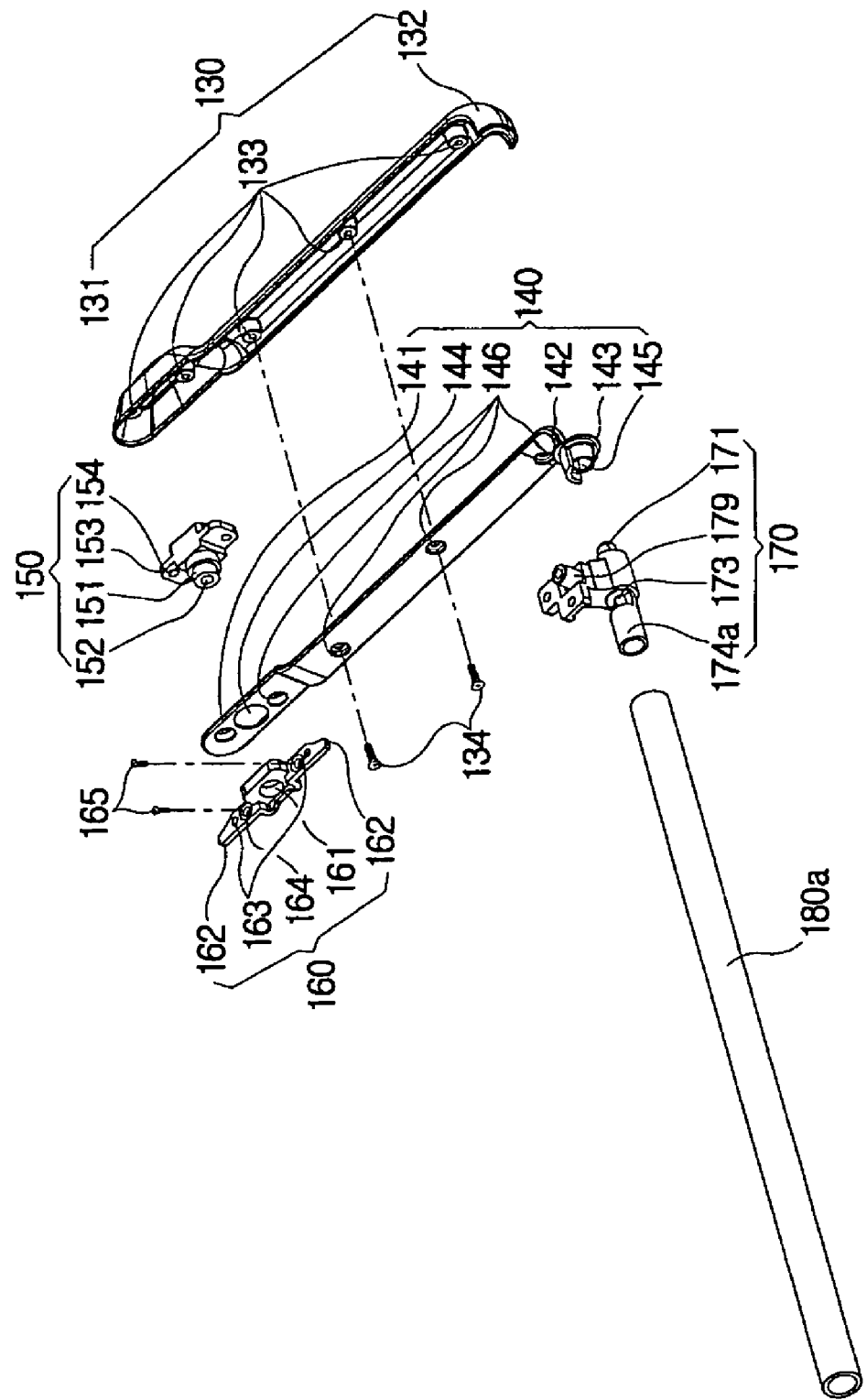
FIG. 14 is a partial enlarged perspective view of the portable computer in FIG. 13.

However, as shown in the embodiment in FIGS. 12 through 14, a connecting link 180a is forcibly fitted to an insertion part 174a. Like components to those shown in FIGS. 5 through 7 have like terminology and detailed descriptions are therefore not provided.

As shown in FIGS. 12 through 14, the connecting link 180a has a pipe shape with a predetermined length. The insertion part 174a is connected to each of the opposite ends of the connecting link 180a and protrudes from the second hinge shaft 171 toward the connecting link 180a. The insertion part 174a of the second shaft member 170 is a second shaft member connector and is forcibly fitted to each of the opposite ends of the connecting link 180a having a groove. As the shown connecting link 180a has a pipe shape, the display 110 resists torsion between the pair of arm links 120 and the display 110 and the pair of arm links 120 can simultaneously rotate as a single body when the display 110 rotates with respect to the main body 101. However, it is understood that the connecting link 180a may be a shape of a bar having grooves only at opposite ends thereof or may have other shapes, both prismatic and non-prismatic.

The shown insertion part 174a as the second shaft member connector has a pipe shape having a groove. The insertion part 174a has a diameter that is less than a diameter of the connecting link 180a. Thus, when the insertion part 174a is inserted in the insides of the opposite ends of the connecting link 180a, the insertion part 174a is forcibly fitted within the corresponding one of the opposite ends of the connecting link 180a. However, it is understood that if the diameter of the insertion part 174a is greater than the diameter of the connecting link 180a, the connecting link 180a could instead be inserted within the insertion parts 174a. Moreover, it is understood that other mechanisms can be used to join the insertion part 174a and the connecting link 180a instead of or in addition to using fasteners.

As described above, the pair of second hinge shafts 171 and the connecting link 180a rotates as a single body. This construction prevents the torsion that otherwise occurs if one of the pair of second shaft members 170 separately rotates when the display 110 rotates with respect to the main body 101 to be adjusted to the closed position (refer to FIG. 1), the unfolded position (refer to FIGS. 3, 4, 8 and 9) and the tablet operation position (refer to 10 and 11). Thus, the display 110 rotates with stability and a malfunction of the display 110 is prevented. That is, if the pair of second shaft members 170 are not simultaneously rotated when the display 110 is rotated with respect to the main body 101, a torsion occurs that may make rotation not smooth and cause the malfunction of the display 110.

In the foregoing embodiments, the first hinge shaft 151 is inserted in the first hinge shaft hole 161 of the first shaft supporting bracket 160 so as to be stationary relative to the hole 161 and the second hinge shaft 171 is inserted in the second hinge hole 145 formed on the extended part 143 of the inner cover 140 so as to be stationary relative to the shaft 171. However, it is understood that the first and second hinge shafts 151 and 171 may have not circular shapes and be non-rotatably inserted in the first hinge shaft hole 161 and the second hinge hole 145, respectively.

As described above, embodiments of the present invention provide a portable computer in which the display is adjusted to a variety of angles as desired with ease and rotates to the tablet operation in which the rear surface of the display is parallel with and in contact with the upper surface of the main body. Further, the connecting link is aligned with the rotation axis of the main body hinge, so that the torsion is prevented and the display is rotated with stability and the malfunction of the display is prevented.

It is understood that, while described in terms of a computer, the instant invention can be used with other electronic devices having movable displays, such as personal digital assistants (PDAs) or telephones, or for non-portable computers. Additionally, while described in terms of a display used in a tablet operation in which the display surface receives input, it is understood that the display need not have an input capability and may instead merely be used to display information.

Although a few embodiments of the present invention have been shown and described, it will be appreciated by those skilled in the art that changes may be made in these embodiments without departing from the principles and spirit of the invention, the scope of which is defined in the accompanying claims and their equivalents.

What is claimed is:

1. A portable computer comprising:
 a main body having a processor;
 a display which is controlled by the processor to display information having a first surface and a second surface opposite the first surface, the display being adjustably connected to the main body so as to be adjusted to a closed position, in which the first surface is substantially parallel with and in contact with the main body to be folded onto the main body, and to a tablet operation position, in which the second surface is substantially parallel with and in contact with the main body to be folded onto the main body;
 a pair of arm links to connect the display with the main body;
 display hinges comprising a first hinge shaft rotatably connected between the display and corresponding first ends of the arm links and about which the display rotates relative to the pair of arm links on a first rotation axis of the first hinge shaft;
 main body hinges comprising a second hinge shaft rotatably connected between the main body and corresponding second ends of the arm links and rotatably connected about which the pair of arm links rotates relative to the main body on a second rotation axis of the second hinge shaft substantially parallel with and spaced from the first rotation axis; and
 a connecting link having a first cover to cover an upper part of the connecting link and a second cover to cover a lower part of the connecting link, the connecting link being removably connected to each of the second hinge shafts of the main body hinges and rotating about the main body on the second rotation axis together with the arm links.

2. The portable computer according to claim 1, wherein a first one of the arm links is disposed at a first side of the display and is substantially parallel with a second one of the arm links, and the second arm link is disposed at a second side of the display opposite to the first side.

3. The portable computer according to claim 2, wherein each of the arm links comprises:
 an outer cover forming an outer enclosure, and
 an inner cover combined to the outer cover to form an accommodating space inside the corresponding arm link, the inner cover comprising a first end having a first hinge hole, and a second end opposite the first end and comprising an extended part having a second hinge hole, the inner cover being located closer to a side surface of the display than the outer cover.

4. The portable computer according to claim 3, wherein the display comprises:
   an LCD panel viewable from the first surface,
   a first cover, and
   a second cover connected to the first cover to support the corresponding sides of the LCD panel.

5. The portable computer according to claim 4, wherein each of the display hinges comprises:
   a first shaft member comprising the first hinge shaft that passes through the first hinge hole and is aligned with the first rotation axis, and a first shaft supporter rotatably connected to the first hinge shaft with a predetermined rotation friction; and
   a first shaft supporting bracket combined to the second cover to support the first shaft member on the display.

6. The portable computer according to claim 5, wherein:
   one of the first shaft members has a first cable through hole formed along the first rotation axis, and
   a corresponding one of the first shaft supporting brackets has a first hinge shaft hole aligned with the first cable through hole and which accommodates the first hinge shaft which passes through the first hinge hole of the inner cover.

7. The portable computer according to claim 4, wherein:
   the first cover comprises a first latch hole,
   the second cover comprises a second latch hole, and
   the portable computer further comprises a latch member to be latched to or released from the first latch hole when the display is in the closed position and to be latched to or released from the second latch hole when the display is in the tablet operation position.

8. The portable computer according to claim 7, further comprising a knob connected to the latch member to move the latch member between a latching position and a releasing position so as to be latched to or released from the first and second latch holes.

9. The portable computer according to claim 3, wherein each of the main body hinges comprises a second shaft member interposed between the extended part of the corresponding arm link, a corresponding one of opposite ends of the connecting link, and the main body.

10. The portable computer according to claim 9, wherein each of the second shaft members comprises:
    the second hinge shaft inserted so as to be stationary in the second hinge hole of the corresponding extended part aligned with the second rotation axis;
    a second shaft supporter having a first end rotatably connected to the second hinge shaft with a predetermined rotation friction and a second end to be connected to the main body; and
    a second shaft member connector extended from the second hinge shaft toward the corresponding end of the connecting link to which the second shaft member is connected.

11. The portable computer according to claim 10, wherein each of the second hinge shafts comprises:
    a second cable through hole formed along the second rotation axis and in communication with the accommodating space of the corresponding arm link; and
    an opening in communication with the second cable through hole and formed between the corresponding second shaft member connector and the corresponding second hinge shaft.

12. The portable computer according to claim 11, further comprising at least one cable having a first end connected to the display and a second end connected to the main body.

13. The portable computer according to claim 12, wherein:
    the at least one cable comprises a pair of cables, and
    each of the cables has the first end connected to the display and the second end connected to the main body by passing through the accommodating space inside of the corresponding arm link to be connected to the main body.

14. The portable computer according to claim 13, wherein the second end of each of the cables:
    passes through the first cable through hole of the corresponding first shaft member, the accommodating space inside of the corresponding arm link, and the second cable through hole of the corresponding second hinge shaft, and
    is drawn out through the opening of the corresponding second hinge shaft to be connected to the main body.

15. The portable computer according to claim 10, wherein one of the second shaft member connectors is connected to the corresponding end of the connecting link using a fastener.

16. The portable computer according to claim 10, wherein one of the second shaft member connector is forcibly fitted to the corresponding end of the connecting link so as to be connected to the connecting link.

17. The portable computer according to claim 16, wherein the second shaft member connector has a shape that is substantially the same but other than a shape of the corresponding end of the connecting link such that the second shaft member connecter overlaps the corresponding end of the connecting link so as to be forcibly connected to the connecting link.

18. The portable computer according to claim 17, wherein the second shaft member connector has a circular cross sectional shape that is substantially the same but has a diameter which is less than a diameter of a circular cross sectional shape of the corresponding end of the connecting link such that the second shaft member connecter fits within the corresponding end of the connecting link so as to be forcibly connected to the connecting link.

19. The portable computer according to claim 1, wherein:
    each of the main body hinges is provided between a second end of the corresponding arm link and a corresponding upper part of the rear side of the main body, and
    the connecting link is on the first of the main body to be aligned with the second rotation axis.

20. The portable computer according to claim 1, further comprising a battery assembly provided under the first side at which the connecting link is on, the battery assembly being detachably connected to the main body.

21. The portable computer according to claim 1, wherein:
    each of the display hinges provides a predetermined amount of friction such that the display hinges provide a sufficient amount of force to maintain the display at a predetermined angle relative to the pair of arm links, and
    each of the main body hinges provides a predetermined amount of friction such that the main body hinges maintain the pair of arm links at a predetermined angle relative to the main body.

22. The portable computer according to claim 1, further comprising first and second cables which pass power and/or electrical signals between the main body and the display, wherein the first cable passes through an interior of a first one of the arm links and the second cable passes through an interior of a second one of the arm links other than the first arm link.

23. The portable computer according to claim 22, wherein:
    each of the display hinges includes a through hole through which the corresponding one of the first and second cables pass between the main body and the interior of the corresponding one of the arm links, and
    each of the main body hinges includes a through hole through which the corresponding one of the first and second cables pass between the display and the interior of the corresponding one of the arm links.

24. An apparatus for displaying information comprising:
    a main body;
    a display comprising a display housing including a display surface on which information is displayed; and
    a link comprising first elements connected to the main body using corresponding body hinges and connected to the display using corresponding display hinges, and a second element removably connected between the first elements, the second element having a first cover to cover an upper part of the second element and a second cover to cover a lower part of the second element;
    wherein:
        the link is rotatably connected to the main body and the display such that the display surface can be rotated to be substantially parallel with and facing the main body in a first position, to be substantially parallel with and facing away from the main body in a second position, and to be substantially non-parallel with the main body in a third position,
        the body hinges include torsional elements which maintain the first element at a predetermined angle relative to the main body,
        the display hinges include torsional elements which maintain the first element at a predetermined angle relative to the display,
        each of the display hinges comprises a first pivot mechanism comprising:
            a first shaft rotatably attached to the first element and extending through a first hinge hole of the first element; and
            a first shaft bracket attached within the display housing and which receives and non-rotatably supports the first shaft received through an opening in the display housing and the first hinge hole, and
        each of the body hinges comprises a second pivot mechanism comprising:
            a second shaft received in and rotatably attached at an opening in the first element, and
            an extended portion non-rotatably attached to the second element and the second shaft such that the first and second elements rotate according to the rotation of the second shaft.

25. The apparatus of claim 24, wherein the first pivot mechanism further comprises a first shaft supporter which non-rotatably connects to the first element and which includes a rotational element connected to the first shaft and which applies a frictional force to act as one of the torsional elements.

26. The apparatus of claim 24, wherein the second pivot mechanism further comprises a second shaft supporter which non-rotatably connects to the main body and which includes a rotational element connected to the second shaft and which applies a frictional force to act as one of the torsional elements.

27. The apparatus of claim 26, wherein the second element comprises a bar member extending between opposing sides of the main body.

28. The apparatus of claim 27, wherein:
    each of the first elements includes a housing having a first passageway,
    each of the first pivot mechanisms includes a first through hole in communication with the first passageway and an interior of the display housing,
    each of the second pivot mechanisms includes a second through hole in communication with the first passageway and an interior of the main body, and
    the apparatus further comprises cables passing through the first passageway, the first and second through holes so as to pass information and/or power between the display and the main body.

29. The apparatus of claim 28, wherein the first and second pivot mechanisms pivot about substantially parallel axes.

30. A portable computer comprising:
    a main body having a processor;
    a display which is controlled by the processor to display information having a first surface and a second surface opposite the first surface, the display being adjustably connected to the main body so as to be adjusted to a closed position, in which the first surface is substantially parallel with and in contact with the main body to be folded onto the main body, and to a tablet operation position, in which the second surface is substantially parallel with and in contact with the main body to be folded onto the main body;
    a pair of arm links to connect the display with the main body;
    display hinges comprising a first hinge shaft rotatably connected between the display and corresponding first ends of the arm links and about which the display rotates relative to the pair of arm links on a first rotation axis of the first hinge shaft;
    main body hinges comprising a second hinge shaft rotatably connected between the main body and corresponding second ends of the arm links and rotatably connected about which the pair of arm links rotates relative to the main body on a second rotation axis of the second hinge shaft substantially parallel with and spaced from the first rotation axis;
    a substantially pipe-shaped connecting link rotating about the main body on the second rotation axis together with the arm links; and
    insertion parts protruding from the second hinge shaft toward opposite ends of the connecting link and forcibly fitted to each of the opposite ends of the connecting link, so as to resist torsion between the pair of arm links and the display.

31. The portable computer of claim 30, wherein the insertion parts have grooves and are forcibly fitted to each of the opposite ends of the connecting link having a groove.

* * * * *

UNITED STATES PATENT AND TRADEMARK OFFICE
CERTIFICATE OF CORRECTION

| | |
|---|---|
| PATENT NO. | : 7,277,275 B2 |
| APPLICATION NO. | : 10/819286 |
| DATED | : October 2, 2007 |
| INVENTOR(S) | : Bum-young Won et al. |

Page 1 of 1

It is certified that error appears in the above-identified patent and that said Letters Patent is hereby corrected as shown below:

Title Pg, Item (56) (Other Publications), Line 1, change "Enclyclopedia." to --Encyclopedia.--.

Signed and Sealed this

Fifteenth Day of April, 2008

JON W. DUDAS
*Director of the United States Patent and Trademark Office*